United States Patent [19]

Busse

[11] Patent Number: 4,587,015

[45] Date of Patent: May 6, 1986

[54] PLATE FILTER PRESS

[75] Inventor: Oswald Busse, Aarbergen, Fed. Rep. of Germany

[73] Assignee: Passavant-Werke AG & Co. KG, Fed. Rep. of Germany

[21] Appl. No.: 619,796

[22] Filed: Jun. 12, 1984

[30] Foreign Application Priority Data

Jun. 13, 1983 [DE] Fed. Rep. of Germany ....... 3321340

[51] Int. Cl.$^4$ .............................................. B01D 25/12
[52] U.S. Cl. ..................................... 210/224; 100/195
[58] Field of Search ................................ 210/224–231, 210/323.1, 262; 100/194–202, 237

[56] References Cited

U.S. PATENT DOCUMENTS

| 905,341 | 12/1908 | Merrill | 210/225 |
| 2,142,581 | 1/1939 | Winegar | 100/195 |
| 3,620,374 | 11/1971 | Brinkema | 210/231 |

Primary Examiner—Richard V. Fisher
Assistant Examiner—W. Gary Jones
Attorney, Agent, or Firm—Jennings, Carter, Thompson & Veal

[57] ABSTRACT

In order to enlarge the size of the filter plates of a plate filter press without prejudicing the handling of the filter plates, an additional filter plate is arranged beneath each filter plate and is connected to this uppermost filter plate by members, such as by articulated connecting elements. Suspension and guide means are provided only for the uppermost filter plates.

5 Claims, 2 Drawing Figures

PLATE FILTER PRESS

BACKGROUND OF THE INVENTION

This invention relates to a plate filter press and more particularly to such a filter press which has a plurality of filter plates suspended for movement along guide means parallel to the filter press length.

When filter presses get too large, that is, when their filter plates exceed a certain size, such as 2 m by 2 m, their manufacture and handling becomes difficult. For one thing, larger filter plates have higher requirements regarding their stability, which can be met by the selection of the material from which they are made or by adjusting the thickness correspondingly. Such filter plates are difficult to handle while working with the filter press, not only because of their weight but also because of their bulky dimensions.

BRIEF SUMMARY OF THE INVENTION

To overcome the above difficulties, an object of my invention is to provide a filter press having the largest plates possible which are still easy to handle. This object is achieved by providing a plate filter press having an additional filter plate which is arranged beneath each filter plate of a plurality of upper filter plates and is connected to its upper filter plate by connecting elements. A filter press with such a double filter plate does not have substantially any higher space requirements above floor level than a filter press with a commmon filter plate having a size of 2 m by 2 m. The two mutually connected filter plates are individually more easily handled than one single piece filter plate of the same size. Such filter plates can consist, in particular, of plastic-like materials which make them even lighter than a cast steel plate of the same size. Another advantage is that the filter cake is split in two whereby the depth of the bunker may remain essentially the same. Also, the mutually connected filter plates may have the same construction, thus facilitating their manufacture substantially. It is also beneficial if the lower filter plate is connected articulately to the upper filter plate. Furthermore, the suspension and guide means for the mutually connected filter plates is provided exclusively for the upper filter plate.

DESCRIPTION OF THE DRAWING

Apparatus embodying features of my invention is illustrated in the accompanying drawing, forming a part of this application, in which.

DETAILED DESCRIPTION

Figure 1:
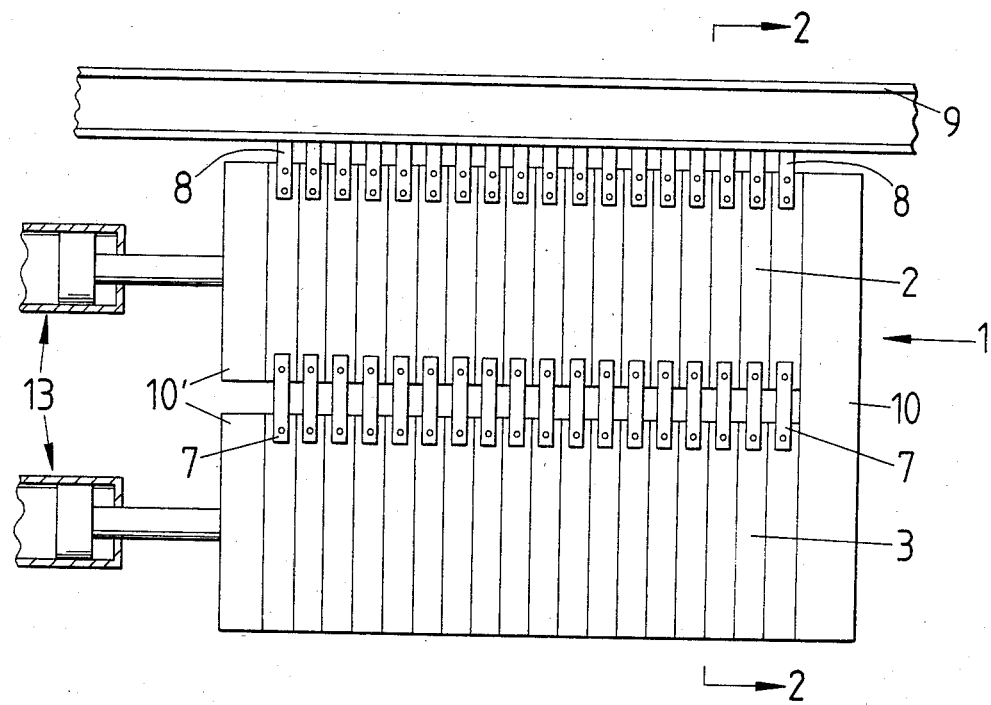
FIG. 1 is a schematic view showing my improved plate filter press.
Figure 2:
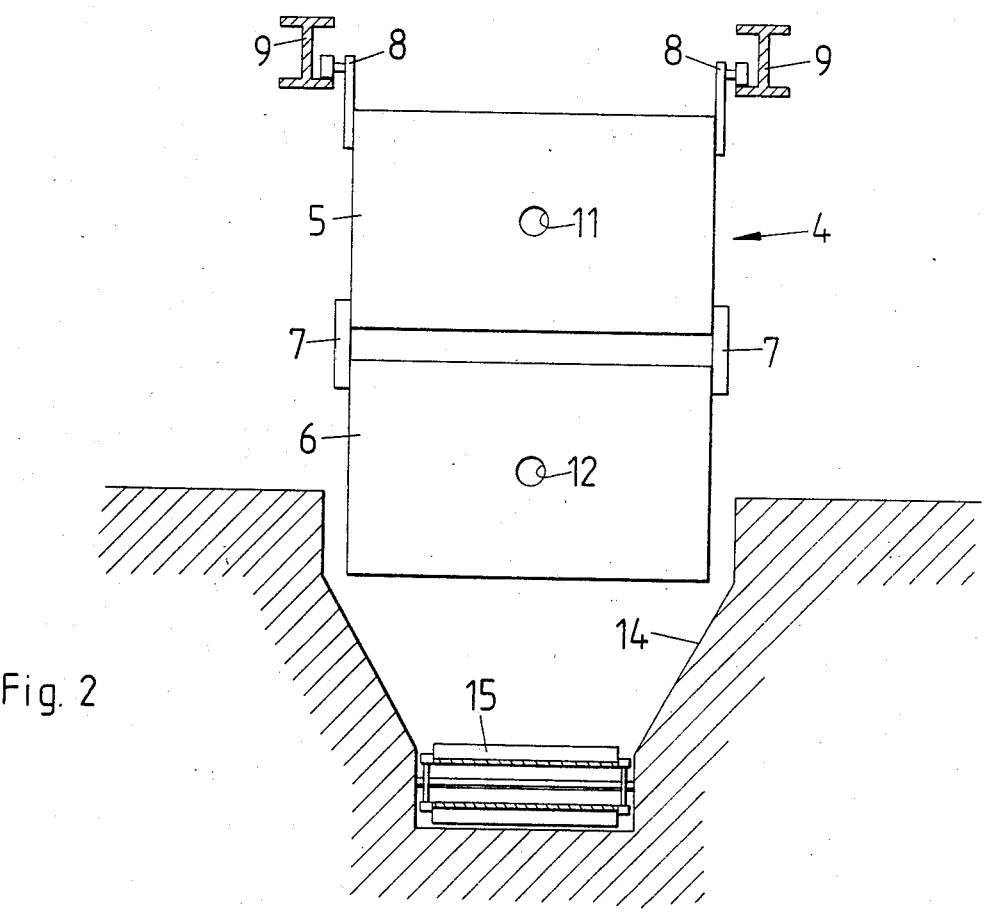
FIG. 2 is a sectional view taken generally along the line 2—2 of FIG. 1 showing a double filter plate in elevation.

Referring now to the drawing for a better understanding of my invention, I show in FIG. 1 a schematic representation of a filter press consisting of a filter plate package 1 having an upper package 2 and a lower package 3. The filter plate package 1 consists of double filter plates 4. As shown in FIG. 2, the double filter plate 4 consists of an upper filter plate 5 and a lower filter plate 6. The lower filter plate 6 is connected articulately to the upper filter plate 5 by means of two connecting elements 7 which may be in the form of joint plates, as shown. The upper filter plate 5 is provided with suitable suspension and guide means 8 and is suspended from an overhead beam of the filter press which may consist of two I-beams 9, as shown. The double filter plates 4 forming the filter plate package are pressed together by end plates 10 and 10' located at opposite ends of the filter plate package 1. The left end plate 10' is split in two to provide two end plate parts, as shown in FIG. 1, with each plate part being actuated by a hydraulic cylinder 13. A filter chamber is created between adjacent filter plates in a manner well understood in the art to which my invention relates. Also, the filter media is fed in the usual manner through aligned central bores 11 and 12 provided in the filter plates 5 and 6, respectively.

Each of the individual filter plates 5 and 6 can, for instance, have a rectangular profile positioned with the dimensions 1.5 m by 2 m, so that the total filtration area for the double filter plate 4 is 6 sq.m. A single piece filter plate with a corresponding filtration area would be difficult to handle, especially during the installation and disassembly and would, as a single plate, require a much higher stability than my improved double filter plate 4 having two individual plates 5 and 6 which may also be formed of or consist of a plastic-like material.

The lower portion of each lower filter plate 6 extends into a filter cake bunker, indicated generally at 14. A conventional conveying device, such as a drag chain conveyor 15 is provided at the bottom of the bunker 14 for receiving the filter cake.

The suspension of the filter plates at the outer sides of the plates has the advantage that a conventional spraying device can apply a spray from above. The outer joint connections 7 of the double plates also facilitates the washing operation. The spraying conduit may be guided by conventional means such as ropes, telescoping cylinders, scissors brackets and the like. Also, a conventional spraying carriage may run along the upper flanges of the I-beams 9 in a manner well understood in the art to which my invention relates.

While I have shown my invention in but one form, it will be obvious to those skilled in the art that it is not so limited, but is susceptible of various changes and modifications without departing from the spirit thereof.

What I claim is:

1. In a plate filter press having a plurality of vertically oriented filter plates with each filter plate being supported for movement along horizontal guide means parallel to the filter press length, the improvement comprising:

(a) an additional filter plate arranged beneath each filter plate which is supported for movement along said guide means so that each additional filter plate depends beneath an upper filter plate in substantially the same vertical plane therewith and said guide means is provided exclusively for said upper filter plate, and (b) connecting elements connecting each additional filter plate to its upper filter plate for substantially concomitant motion therewith.

2. A plate filter press as defined in claim 1 in which said connecting elements connect said additional filter plate articulately to said upper filter plate.

3. A plate filter press as defined in claims 1 or 2 in which said upper and said additional filter plates consist of a plastic material.

4. A plate filter press as defined in claims 1 or 2 in which said upper and said additional filter plates are of the same size and construction.

5. A plate filter press as defined in claims 1 or 2 in which each said filter plate is supported at the outer sides thereof.

* * * * *